(12) United States Patent
Chuang

(10) Patent No.: US 10,307,654 B2
(45) Date of Patent: Jun. 4, 2019

(54) SWIM TRAINING SYSTEM, SWIM DATA COMPUTATION METHOD USING THE SAME, AND SWIM TRAINING METHOD USING THE SAME

(71) Applicant: NANO-SECOND TECHNOLOGY CO., LTD., New Taipei (TW)

(72) Inventor: Pei-Sung Chuang, New Taipei (TW)

(73) Assignee: NANO-SECOND TECHNOLOGY CO., LTD., New Taipei (TW)

( * ) Notice: Subject to any disclaimer, the term of this patent is extended or adjusted under 35 U.S.C. 154(b) by 406 days.

(21) Appl. No.: 15/389,021

(22) Filed: Dec. 22, 2016

(65) Prior Publication Data

US 2017/0157486 A1 Jun. 8, 2017

Related U.S. Application Data

(63) Continuation-in-part of application No. 14/698,333, filed on Apr. 28, 2015, now abandoned.

(30) Foreign Application Priority Data

Oct. 29, 2014 (TW) .............................. 103137495 A

(51) Int. Cl.
*G06K 9/00* (2006.01)
*A63B 21/00* (2006.01)
(Continued)

(52) U.S. Cl.
CPC .......... *A63B 69/12* (2013.01); *A63B 21/0442* (2013.01); *A63B 21/0557* (2013.01);
(Continued)

(58) Field of Classification Search
CPC .............................. A63B 69/12; A63B 24/0003
See application file for complete search history.

(56) References Cited

U.S. PATENT DOCUMENTS 2,825,224 A * 3/1958 Lindenauer ............ A63B 69/12
434/254
3,517,930 A * 6/1970 Jacobsen ............ A63B 21/0084
482/55
(Continued)

FOREIGN PATENT DOCUMENTS

CN 2853117 1/2007
DE 2653935 6/1978
(Continued)

OTHER PUBLICATIONS

United States Patent and Trademark Office, "Final Office Action," issued in connection with U.S. Appl. No. 14/698,333, dated Aug. 25, 2016, 14 pages.

(Continued)

*Primary Examiner* — Jennifer M Deichl
(74) *Attorney, Agent, or Firm* — Hanley, Flight & Zimmerman, LLC

(57) ABSTRACT

A swim training system, a swim data computation method using the same, and a swim training method using the same are provided. The swim training system includes a training device and a processing device. The training device measures a tension in a connecting component which is fastened to a swimmer. The processing device selects a conversion parameter from a conversion parameter table in the processing device according to a swimmer information. Then the processing device performs a conversion between the tension and a swimming speed with the conversion parameter to obtain the swimming speed of the swimmer.

21 Claims, 12 Drawing Sheets

(51) Int. Cl.
*A63B 21/04* (2006.01)
*A63B 24/00* (2006.01)
*A63B 69/12* (2006.01)
*A63B 71/06* (2006.01)
*A63B 21/055* (2006.01)

(52) U.S. Cl.
CPC ...... *A63B 21/4009* (2015.10); *A63B 21/4043* (2015.10); *A63B 24/0062* (2013.01); *A63B 71/0622* (2013.01); *G06K 9/00342* (2013.01); *A63B 2024/0068* (2013.01); *A63B 2071/065* (2013.01); *A63B 2071/0625* (2013.01); *A63B 2071/0675* (2013.01); *A63B 2208/0261* (2013.01); *A63B 2220/20* (2013.01); *A63B 2220/30* (2013.01); *A63B 2220/31* (2013.01); *A63B 2220/803* (2013.01); *A63B 2220/806* (2013.01); *A63B 2225/50* (2013.01); *A63B 2225/60* (2013.01); *A63B 2230/75* (2013.01)

(56) References Cited

U.S. PATENT DOCUMENTS

| | | | | |
|---|---|---|---|---|
| 3,861,675 A | * | 1/1975 | Hopper | A63B 69/12 482/55 |
| 3,988,020 A | * | 10/1976 | Carter | A63B 69/12 482/55 |
| 4,524,711 A | * | 6/1985 | Ashrow | A63B 69/12 114/215 |
| 4,681,118 A | * | 7/1987 | Asai | A61B 5/0006 128/903 |
| 5,391,080 A | * | 2/1995 | Bernacki | A63B 69/12 434/254 |
| 5,685,723 A | * | 11/1997 | Ladin | A63B 69/12 368/10 |
| 5,813,945 A | * | 9/1998 | Bernacki | A63B 21/153 434/247 |
| 5,846,167 A | * | 12/1998 | Liu | A63B 69/12 482/55 |
| 5,864,518 A | * | 1/1999 | Geiser | A63B 71/0686 368/10 |
| 5,938,565 A | * | 8/1999 | Bernacki | A63B 21/153 434/247 |
| 6,033,228 A | * | 3/2000 | Ladin | A63B 33/002 368/10 |
| 6,634,993 B1 | * | 10/2003 | Morr | A63B 21/0552 434/254 |
| 7,345,958 B1 | * | 3/2008 | Kneafsey | G04F 10/00 368/107 |
| 9,216,341 B2 | * | 12/2015 | Li | A61B 5/1112 |
| 2009/0239710 A1 | * | 9/2009 | Shemesh | A61B 5/1124 482/8 |
| 2010/0204952 A1 | * | 8/2010 | Irlam | A61B 5/11 702/141 |
| 2010/0304934 A1 | * | 12/2010 | Woodson | A63B 24/0062 482/8 |
| 2011/0149694 A1 | * | 6/2011 | Sakita | A63B 69/12 368/10 |
| 2011/0256989 A1 | * | 10/2011 | Boelter Lienke | A63B 69/12 482/55 |
| 2012/0088214 A1 | * | 4/2012 | Brodbeck | A63B 69/12 434/254 |
| 2014/0155227 A1 | * | 6/2014 | Bellerive | A63B 69/12 482/55 |
| 2014/0171268 A1 | | 6/2014 | Frolov | |
| 2014/0171270 A1 | * | 6/2014 | Frolov | A63B 35/00 482/55 |
| 2015/0290517 A1 | * | 10/2015 | Saleh | A63B 69/12 434/254 |
| 2016/0121194 A1 | | 5/2016 | Chuang | |

FOREIGN PATENT DOCUMENTS

| | | |
|---|---|---|
| GB | 2382525 | 6/2003 |
| GB | 2422559 | 8/2006 |
| TW | 221334 | 2/1994 |
| TW | 352001 | 2/1999 |
| TW | I221334 | 9/2004 |
| TW | 201615244 | 5/2016 |

OTHER PUBLICATIONS

United States Patent and Trademark Office, "Non-Final Office Action," issued in connection with U.S. Appl. No. 14/698,333, dated Mar. 24, 2016, 15 pages.

Taiwan Intellectual Property Office, Office Action issued in connection with Taiwan Application No. 106113399, dated Oct. 18, 2017, 9 pages.

* cited by examiner

SWIM TRAINING SYSTEM, SWIM DATA COMPUTATION METHOD USING THE SAME, AND SWIM TRAINING METHOD USING THE SAME

CROSS-REFERENCE TO RELATED APPLICATIONS

This application is a continuation in part application of U.S. patent application Ser. No. 14/698,333 filed on Apr. 28, 2015, entitled "SWIM TRAINING DEVICE", which claims priority under 35 U.S.C. § 119(a) on Patent Application No(s). 103137495 filed in Taiwan, R.O.C. on Oct. 29, 2014, the entire contents of which are hereby incorporated by reference.

TECHNICAL FIELD

The disclosure relates to a swim training system, a swim data computation method using the same, and a swim training method using the same, more particularly to a swim training system which converts a tension into a swimming speed, a swim data computation method using the same, and a swim training method using the same.

BACKGROUND

According to the research, swimming is an exercise which causes fewer injuries for exercisers than jogging, cycling and ball games. Swimming increases cardiopulmonary function, muscle strength and metabolic rate of human bodies. In order to acquire the benefits mentioned above, people have to have enough swimming distance during the swimming process. However, the watercourse length of the swimming pool at home is limited by the size of the backyard and causing the inconvenience of the swim training.

U.S. Patent Application Publication No. 2004/0171270 discloses a swim training device. The swim training device includes a sensor and a restraint component. One end of the restraint component is fastened to a side of a water tank, and the other end of the restraint component is fastened to a swimmer. The sensor measures the force applied on the restraint component when the swimmer is swimming in the water tank. Therefore, this swimming training device helps the swimmer to do the swimming training in the water tank, and obtains a swimming speed of the swimmer by the processor according to the force measured by sensor. However, the accuracy of the swimming speed obtained by this swim training device is arguable.

SUMMARY

The present disclosure provides a swim training system, a swim data computation method using the same, and a swim training method using the same, wherein a processing module of the swim training system performs the conversion between the tension and the swimming speed according to the height, the weight, and the swimming stroke so as to improve the accuracy of the swimming speed, and thus, the swim training effect can also be improved.

According to one embodiment, a swim training system includes a training device and a processing device. The training device includes a wearing component, a fastening component, a connecting component, and a sensor. The wearing component is configured to fix the training device to a user. The connecting component is configured to connect the wearing component to the training device fastening component. The sensor is installed on the connecting component and located between the wearing component and the fastening component, and the sensor is configured to measure a tension of the connecting component. The processing device includes an input module, a storage module, a processing module, and a output module. The input module is configured to input an user information, and the user information includes a height, a weight, and a swimming stroke. The storage module is configured to store a conversion parameter table. The processing module is communicatively connected to the sensor, the storage module, and the input module. A conversion parameter is selectable from the conversion parameter table by the processing module according to the user information. The tension is obtainable from the sensor by the processing module, and a tension information is acquirable by the processing module according to the tension. An exercise information is obtainable by the processing module according to the tension information and the conversion parameter. The output module is communicatively connected to the processing module, and the output module is configured to output the exercise information.

According to one embodiment, a swim data computation method for the above swim training system includes the following steps. Select the conversion parameter from the conversion parameter table by the processing module according to the user information. Measure the tension by the sensor. Acquire the tension information by the processing module according to the tension obtained from the sensor. Obtain the exercise information by the processing module according to the tension information and the conversion parameter.

According to one embodiment, a swim training method for the above swim training system includes the following steps. Build a comparison exercise information of a comparison swimming process in the storage module, wherein the comparison exercise information includes a Nth comparison instantaneous swimming speed to a (N+1)th comparison instantaneous swimming speed and a Nth timing to a (N+1)th timing which respectively correspond to the Nth comparison instantaneous swimming speed to the (N+1)th comparison instantaneous swimming speed, or a Nth comparison tension information to a (N+1)th comparison tension information and the Nth timing to the (N+1)th timing which respectively correspond to the Nth comparison tension information to the (N+1)th comparison tension information, wherein N is a positive integer greater than zero. Select the conversion parameter from the conversion parameter table by the processing module according to the user information. Measure a Nth training tension to a (N+1)th training tension at the Nth timing to the (N+1)th timing, respectively, by the sensor, wherein the Nth training tension corresponds to the Nth timing, and the (N+1)th training tension corresponds to the (N+1)th timing. Acquire a Nth training tension information to a (N+1)th training tension information by the processing module according to the Nth training tension to the (N+1)th training tension which are obtained from the sensor. Obtain a training exercise information by the processing module according to the Nth training tension information to the (N+1)th training tension information and the conversion parameter. Compare the comparison exercise information and the training exercise information which are corresponding to each other by the processing module to obtain a comparison result.

According to the swim training system, the swim data computation method using the same, and the swim training method using the same, the conversion parameter is selected from the conversion parameter table according to the user information so as to perform the conversion between the tension and the swimming speed. As a result, the processing module performs the conversion between the tension and the swimming speed with a proper conversion parameter, and therefore, a more accurate swimming speed is obtained.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
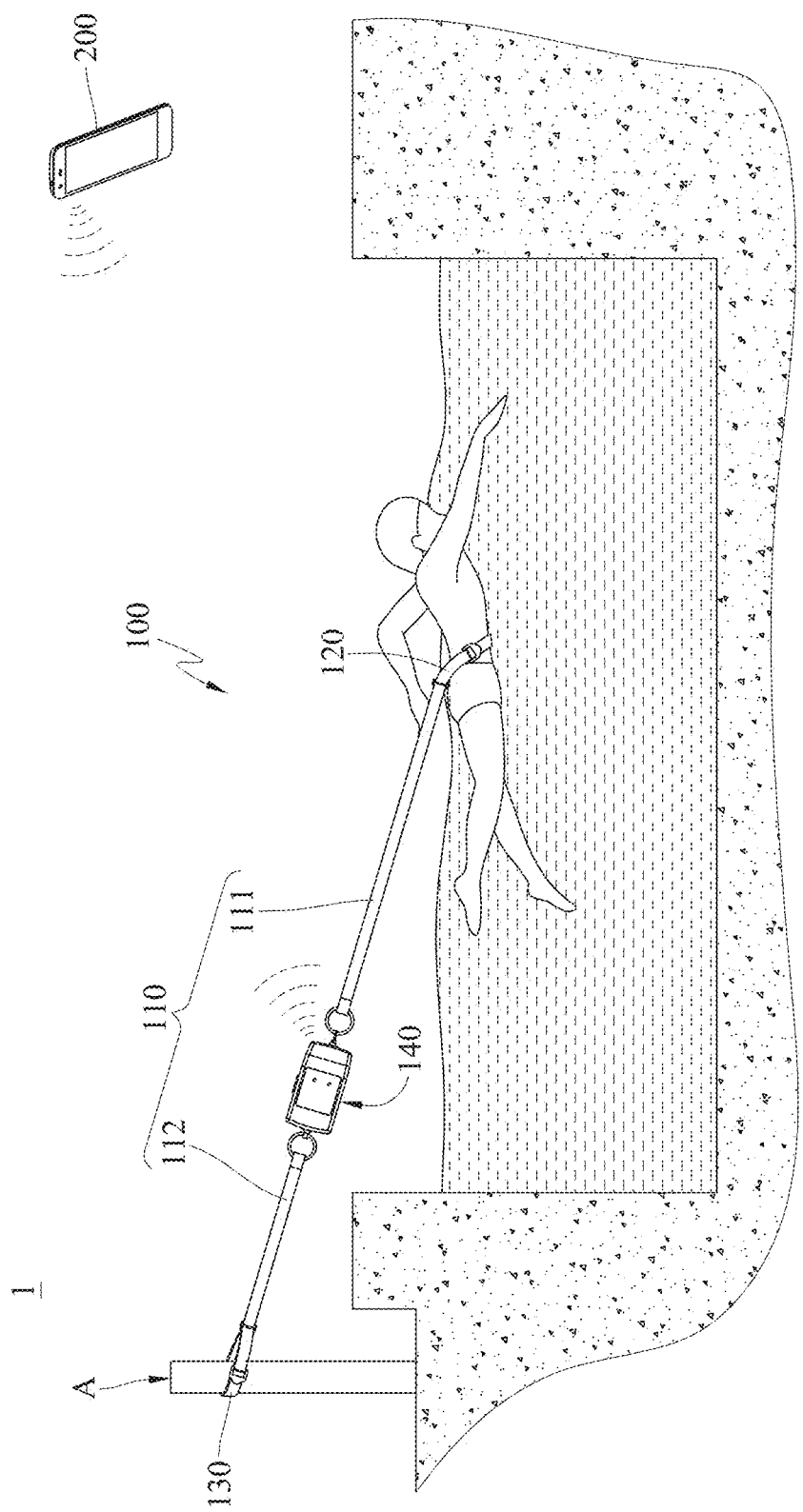
FIG. 1 is a schematic view of a swim training system according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
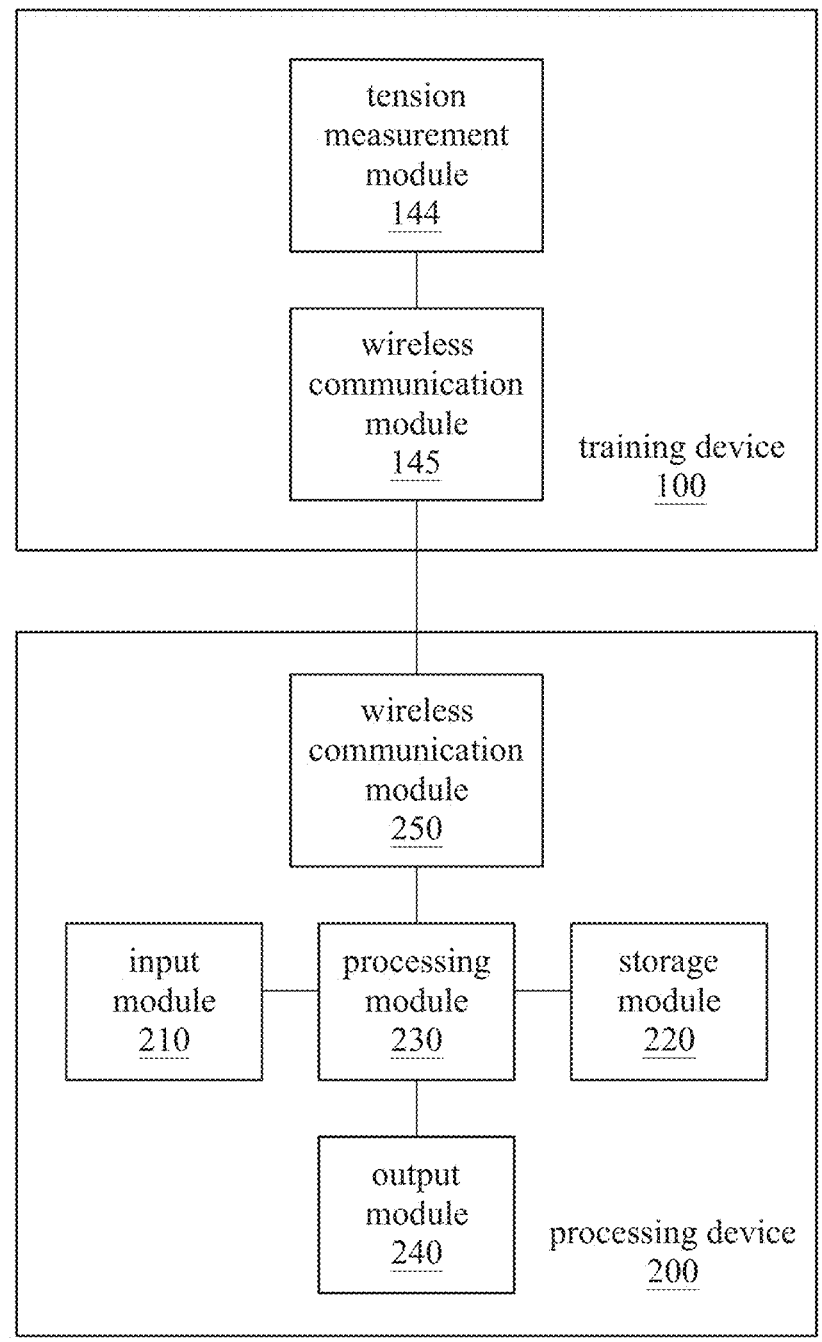
FIG. 2 is a function block diagram of the swim training system according to the first embodiment of the present disclosure.
Figure 3:
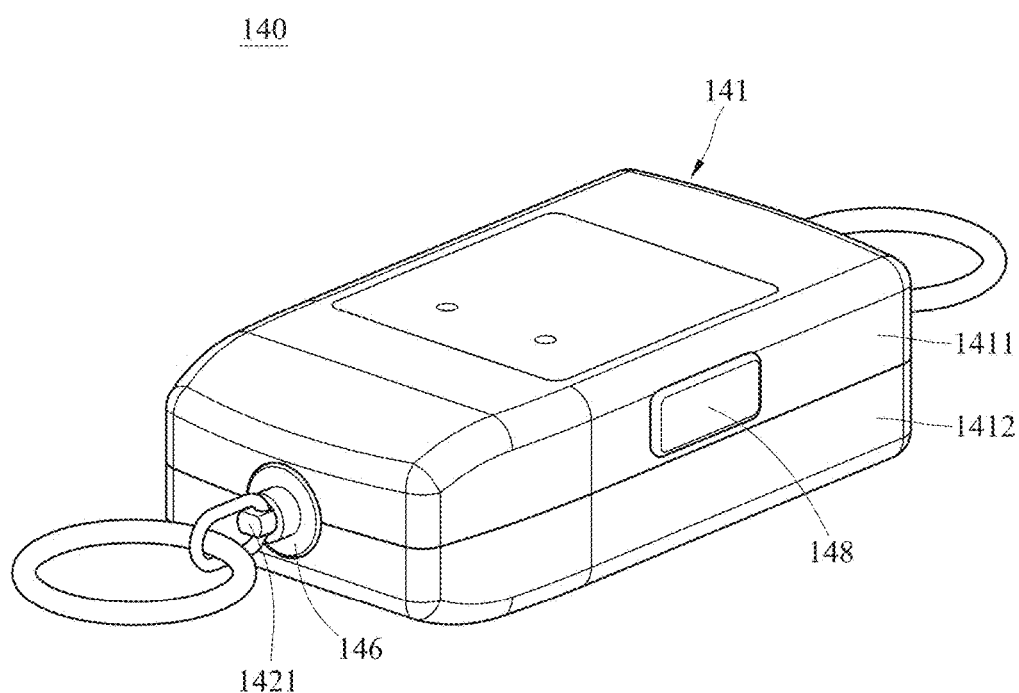
FIG. 3 is a perspective view of a sensor according to the first embodiment of the present disclosure.
Figure 4:
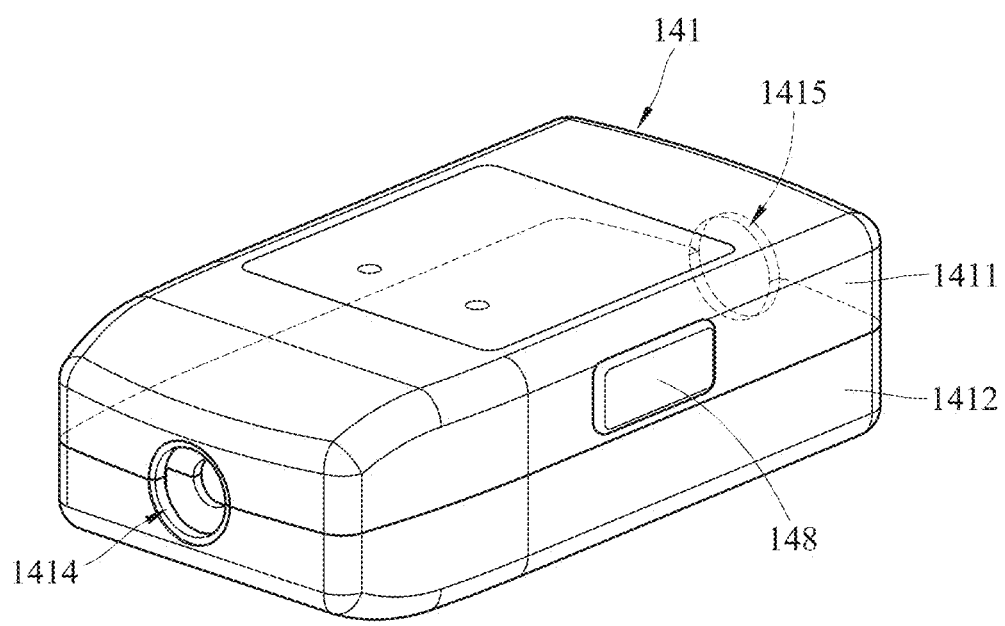
FIG. 4 is a perspective view of the sensor omitting a bar and two liquid resist rings according to the first embodiment of the present disclosure.
Figure 5:
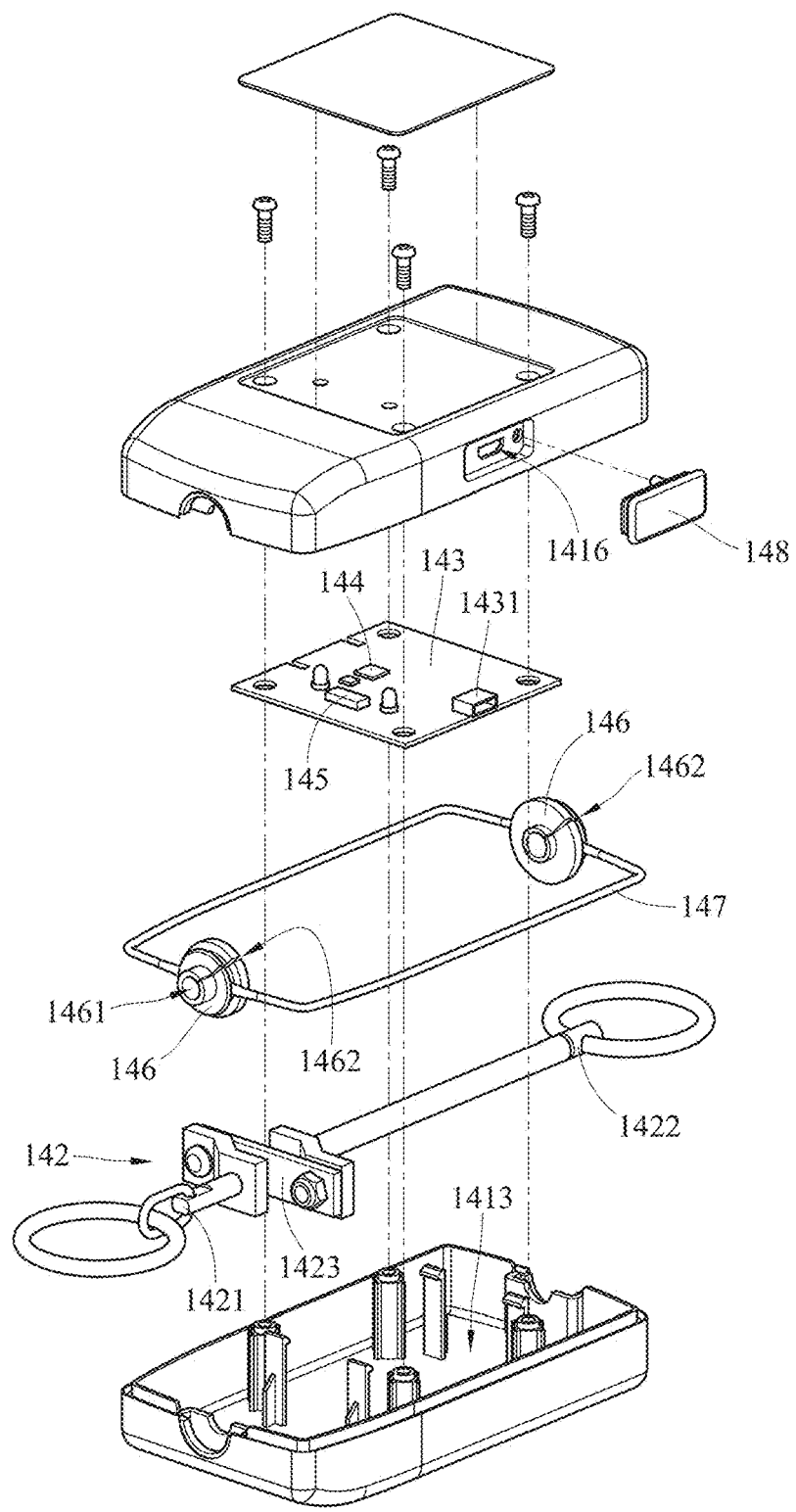
FIG. 5 is an exploded view of the sensor according to the first embodiment of the present disclosure.

At the beginning, a swim training system 1 in a first embodiment of the present disclosure is illustrated. Please refer to FIG. 1 to FIG. 5. FIG. 1 is a schematic view of a swim training system according to a first embodiment of the present disclosure. FIG. 2 is a function block diagram of the swim training system according to the first embodiment of the present disclosure. FIG. 3 is a perspective view of a sensor according to the first embodiment of the present disclosure. FIG. 4 is a perspective view of the sensor omitting a bar and two liquid resist rings according to the first embodiment of the present disclosure; FIG. 5 is an exploded view of the sensor according to the first embodiment of the present disclosure.

The swim training system 1 in the first embodiment of the present disclosure includes a training device 100 and a processing device 200. The training device 100 of the swim training system 1 is for a user to swim in a swimming pool or a water tank with a restricted movable distance. The processing device 200 is for the training device 100 to record an exercise information of the user who is swimming and help the user to execute a swim training program according to the exercise information.

As shown in FIG. 1, the training device 100 includes a connecting component 110, a wearing component 120, a fastening component 130, and a sensor 140. The connecting component 110 includes a first section 111 and a second section 112. The connecting component 110 is, for example, a rope or a strap. The wearing component 120 and the sensor 140 are connected by the first section 111, and the fastening component 130 and the sensor 140 are connected by the second section 112. The wearing component 120, such as a belt, is configured to be worn by the user so as to fasten the first section 111 of the connecting component 110 to the user. The fastening component 130, such as a hook or a loop, is configured to fasten the second section 120 of the connecting component to a fixing object A around the swimming pool or the water tank. The fixing object A, for example, is a pillar, a railing, an armrest, or an unmovable object around the swimming pool. As a result, when the user's swimming distance achieve a limited length of the connecting component 110, the user is restrained by the connecting component 110 so that the user is not able to swim toward a direction away from the fixing object A, which is located around the swimming pool.

As shown in FIG. 3 to FIG. 5, the sensor 140 includes a casing 141, a bar 142, a circuit board 143, a tension measurement module 144, a wireless communication module 145, two liquid resistant rings 146, a liquid resistant loop 147, and a liquid resistant cover 148. The casing 141 includes a top case 1411 and a bottom case 1412, and the casing 141 has an accommodation space 1413, a first through hole 1414, a second through hole 1415, and a charging hole 1416. The accommodating space 1413 is formed by the top case 1411 and the bottom case 1412. The first through hole 1414 and the second through hole 1415 are located at two opposite sides of the casing 141 and located at the junction of the top case 1411 and the bottom case 1412, but the present disclosure is not limited thereto. In other embodiments of the present disclosure, both of the first through hole and the second through hole are located at the top case or the bottom case. The charging hole 1416 is located at the top case 1411. The first through hole 1414, the second through hole 1415, and the charging hole 1416 are communicated with the accommodating space 1413.

The bar 142 has a first fastening end 1421 and a second fastening end 1422 which are opposite to each other. The bar 142 also has a deformable part 1423 which is located between and connects the first fastening end 1421 and the second fastening end 1422. The deformable part 1423 is disposed in the accommodating space 1413. The first fastening end 1421 and the second fastening end 1422 respectively penetrate through the first through hole 1414 and the second through hole 1415. The first fastening end 1421 and the second fastening end 1422 are configured to be respectively fastened by the first section 111 and the second section 112 of the connecting component 110. In the first embodiment of the present disclosure, the first fastening end 1421, for example, has a fixing ring, and the second fastening end 1422, for example, also has a fixing ring.

The circuit board 143 is disposed in the accommodating space 1413. The circuit board 143 has a charging connector 1431. A battery (not shown in figures) is electrically connected to the circuit board 143. The charging connector 1431, which is corresponding to the charging hole 1416, is configured to be plug by a charging plug (not shown in figures) so as to charge the battery.

The tension measurement module 144 is disposed in the accommodating space 1413 and electrically connected to the circuit board 143. When the deformable part 1423 is deformed, the tension measurement module 144 obtains an deformation amount of the deformable part 1423 by, for example, a resistance difference of a strain gauge in a bridge resistor; thus, the tension measurement module 144 obtains a tension in the connecting component 110 between the first section 111 and the second section 112.

The wireless communication module 145 is disposed in the accommodating space 1413 and electrically connected to the circuit board 143. The wireless communication module 145 is, for example, an infrared communication module, a wireless network communication module, or a Bluetooth communication module. The wireless communication module 145 is configured to transmit the tension measured by the tension measurement module 144 to the processing device 200. In the first embodiment of the present disclosure, the wireless communication module 145 is the Bluetooth communication module.

Each of the two liquid resistant rings 146 has a clearance hole 1461 and a slit 1462 which are communicated to each other. The clearance hole 1461 and the slit 1462 both extend through the liquid resistant ring 146. The two liquid resistant rings 146 are made of, for example, silicone or plastic. One of the two liquid resistant ring 146, which is located in the first through hole 1414, is coupled with the first fastening end 1421 by the slit 1462 so that the first fastening end 1421 penetrates through the clearance hole 1461 of the liquid resistant ring 146. The liquid resistant ring 146 is pressed by the first fastening end 1421, the top case 1411, and the bottom case 1412 of the casing so that the liquid resistant ring 146 is deformed to seal the slit 1462 on the liquid resistant ring 146. As a result, the liquid resistant ring 146 prevents a damage of the circuit board 143 caused by water which enters the accommodating space 1413 through the first through hole 1414. Similarly, the other liquid resistant ring 146 is coupled with the second fastening end 1422 in the same way, and the other liquid resistant ring 146 is located in the second through hole 1415. As a result, the liquid resistant ring 146 prevents the damage of the circuit board 143 caused by water which enters the accommodating space 1413 through the second through hole 1415.

The liquid resistant loop 147 connects the two liquid resistant rings 146. The liquid resistant loop 147 is dispose at the junction between the top case 1411 and the bottom case 1412 so as to seal a gap between the top case 1411 and the bottom case 1412. The liquid resistant loop 147 is made of, for example, silicone or plastic. Therefore, the liquid resistant loop 147 prevents the damage of the circuit board 143 caused by water which enters the accommodating space 1413 through the gap between the top case 1411 and the bottom case 1412.

The liquid resistant cover 148 is detachably disposed at the charging hole 1416. The liquid resistant cover 148 is made of, for example, silicone or plastic. When the user charges the sensor 140, the liquid resistant cover 148 is detached so as to expose the charging hole 1416 and the charging connector 1431. When the user uses the sensor 140, the liquid resistant cover 148 is disposed at the charging hole 1416 so as to seal the charging hole 1416. Therefore, the liquid resistant cover 148 prevents the water to enter into the accommodating space 1413 from the charging hole 1416.

The processing device 200 includes an input module 210, a storage module 220, a processing module 230, an output module 240, and a wireless communication module 250. As shown in FIG. 2, the input module 210, the storage module 220, the processing module 230, and the output module 240 communicatively connected to the wireless communication module 145 through the wireless communication module 250. In the first embodiment of the present disclosure, the input module 210, the storage module 220, the output module 240, and the wireless communication module 250 are communicatively connected to each other by the processing module 230.

The input module 210 is configured to input a user information or a comparison exercise information to the processing module 230. The user information includes the user's height, weight, and swimming stroke. The comparison exercise information includes a plurality of comparison instantaneous swimming speeds and a plurality of timings which respectively correspond to the plurality of comparison instantaneous swimming speeds, or a plurality of comparison tensions and the plurality of timings which respectively correspond to the plurality of comparison tensions. The storage module 220 stores information required by the processing device 200, which includes a conversion parameter table. The storage module 220 is also available to store the user information inputted by the user, the comparison exercise information, or an exercise information of the user's swimming process.

The processing module 230 is configured to select one conversion parameter from the conversion parameter table in the storage module 220 according to the user information, and the processing module 230 is also configured to generate a tension information according to the tension from the sensor 140. Therefore, the exercise information is obtained by the computation of the processing module 230 according to the tension information and the conversion parameter. The tension information includes the tension and the timing corresponding to the tension. Specifically, the tension information includes the tension and the timing when the tension is measured. The exercise information includes an instantaneous swimming speed information, an average swimming speed, a swimming distance, or a calorie expenditure. The instantaneous swimming speed information includes the instantaneous swimming speed and the timing corresponding to the instantaneous swimming speed. Specifically, the instantaneous swimming speed information includes the instantaneous swimming speed and the timing when the tension for the conversion of the instantaneous swimming speed is measured.

The output module 240 is configured to output the exercise information obtained by the computation of the processing module 230. The wireless communication module 250 and the wireless communication module 145 in the swim training device 1 are communicatively connected to each other so as to receive the tension measured by the sensor 140. The wireless communication module 250 is, for example, an infrared communication module, a wireless network communication module, or a Bluetooth communication module. In the first embodiment of the present disclosure, the wireless communication module 250 is the Bluetooth communication module.

In the first embodiment of the present disclosure, the processing module 230 selects a proper conversion parameter from the conversion parameter table according to the user's height, weight, and swimming stroke. This conversion parameter table is built according to the experiment data. The experiment data is collected from the users, who use a specific swimming stroke but with different height and weight, when they swimming normally in the conventional swimming pool and from the users equipped with the training device 100 when they swimming in the water tank. The conversion parameters, which are for the conversion between the user's instantaneous forward force and the instantaneous swimming speed, are conducted according to water resists of the users' heights, weights, and swimming strokes. In the first embodiment of the present disclosure, when the swimming stroke is the breaststroke, the conversion parameter table is shown in the following table 1. Since the user is restrained by the training device 100, the instantaneous forward force generated by the user, who is swimming, is equal to the tension in the connecting component 110, the tension measured by the sensor 140 is the instantaneous forward force generated by the user, who is swimming. As a result, the user's instantaneous swimming speed is computable by the processing module 230 according to a formula (I), the tension measured by the sensor 140, and the conversion parameter selected according to the user information.

$$V = ef;  \qquad \text{Formula (I)}$$

wherein, V is the instantaneous swimming speed, e is the conversion parameter, and f is the tension.

Further according to the tension measured by the sensor 140, the timing corresponding to the tension, the user information, and the conversion parameter, the average swimming speed, the swimming distance, or the calorie expenditure are computable by the processing module 230.

TABLE 1

|          | 59 (kg)   | 60 (kg)   | 61 (kg)   | 62 (kg)   | 63 (kg)   | 64 (kg)   |
|----------|-----------|-----------|-----------|-----------|-----------|-----------|
| 155 (cm) | 0.0152051 | 0.0151107 | 0.0150186 | 0.0149288 | 0.0148412 | 0.0147559 |
| 156 (cm) | 0.0151513 | 0.0150552 | 0.0149613 | 0.0148696 | 0.0147802 | 0.0146929 |
| 157 (cm) | 0.0150986 | 0.0150007 | 0.0149050 | 0.0148115 | 0.0147203 | 0.0146312 |
| 158 (cm) | 0.0150468 | 0.0149473 | 0.0148498 | 0.0147546 | 0.0146615 | 0.0145706 |
| 159 (cm) | 0.0149961 | 0.0148948 | 0.0147957 | 0.0146987 | 0.0146039 | 0.0145112 |
| 160 (cm) | 0.0149463 | 0.0148433 | 0.0147425 | 0.0146439 | 0.0145473 | 0.0144529 |
| 161 (cm) | 0.0148974 | 0.0147928 | 0.0146904 | 0.0145901 | 0.0144918 | 0.0143957 |
| 162 (cm) | 0.0148494 | 0.0147433 | 0.0146392 | 0.0145372 | 0.0144373 | 0.0143395 |
| 163 (cm) | 0.0148023 | 0.0146946 | 0.0145890 | 0.0144854 | 0.0143838 | 0.0142843 |
| 164 (cm) | 0.0147560 | 0.0146468 | 0.0145396 | 0.0144345 | 0.0143313 | 0.0142302 |
| 165 (cm) | 0.0147106 | 0.0145999 | 0.0144912 | 0.0143845 | 0.0142798 | 0.0141770 |
| 166 (cm) | 0.0146660 | 0.0145538 | 0.0144436 | 0.0143354 | 0.0142291 | 0.0141248 |
| 167 (cm) | 0.0146222 | 0.0145086 | 0.0143969 | 0.0142872 | 0.0141794 | 0.0140736 |
| 168 (cm) | 0.0145792 | 0.0144642 | 0.0143510 | 0.0142398 | 0.0141306 | 0.0140232 |
| 169 (cm) | 0.0145370 | 0.0144205 | 0.0143060 | 0.0141933 | 0.0140826 | 0.0139737 |
| 170 (cm) | 0.0144955 | 0.0143776 | 0.0142617 | 0.0141476 | 0.0140355 | 0.0139252 |
| 171 (cm) | 0.0144547 | 0.0143355 | 0.0142182 | 0.0141027 | 0.0139891 | 0.0138774 |
| 172 (cm) | 0.0144146 | 0.0142941 | 0.0141754 | 0.0140586 | 0.0139436 | 0.0138305 |
| 173 (cm) | 0.0143752 | 0.0142534 | 0.0141334 | 0.0140153 | 0.0138989 | 0.0137844 |
| 174 (cm) | 0.0143365 | 0.0142134 | 0.0140922 | 0.0139727 | 0.0138550 | 0.0137391 |
| 175 (cm) | 0.0142985 | 0.0141741 | 0.0140516 | 0.0139308 | 0.0138118 | 0.0136946 |
| 176 (cm) | 0.0142611 | 0.0141355 | 0.0140117 | 0.0138896 | 0.0137693 | 0.0136508 |
| 177 (cm) | 0.0142243 | 0.0140975 | 0.0139725 | 0.0138492 | 0.0137276 | 0.0136077 |
| 178 (cm) | 0.0141882 | 0.0140602 | 0.0139339 | 0.0138094 | 0.0136865 | 0.0135654 |
| 179 (cm) | 0.0141526 | 0.0140235 | 0.0138960 | 0.0137703 | 0.0136462 | 0.0135238 |
| 180 (cm) | 0.0141177 | 0.0139874 | 0.0138587 | 0.0137318 | 0.0136065 | 0.0134829 |

|          | 65 (kg)   | 66 (kg)   | 67 (kg)   | 68 (kg)   | 69 (kg)   | 70 (kg)   |
|----------|-----------|-----------|-----------|-----------|-----------|-----------|
| 155 (cm) | 0.0146728 | 0.0145920 | 0.0145135 | 0.0144372 | 0.0143632 | 0.0142915 |
| 156 (cm) | 0.0146080 | 0.0145252 | 0.0144447 | 0.0143664 | 0.0142904 | 0.0142166 |
| 157 (cm) | 0.0145443 | 0.0144597 | 0.0143772 | 0.0142970 | 0.0142189 | 0.0141431 |
| 158 (cm) | 0.0144819 | 0.0143954 | 0.0143110 | 0.0142289 | 0.0141488 | 0.0140710 |
| 159 (cm) | 0.0144207 | 0.0143323 | 0.0142461 | 0.0141620 | 0.0140801 | 0.0140003 |
| 160 (cm) | 0.0143606 | 0.0142704 | 0.0141823 | 0.0140964 | 0.0140126 | 0.0139309 |
| 161 (cm) | 0.0143016 | 0.0142096 | 0.0141198 | 0.0140320 | 0.0139463 | 0.0138628 |
| 162 (cm) | 0.0142437 | 0.0141500 | 0.0140584 | 0.0139688 | 0.0138813 | 0.0137959 |
| 163 (cm) | 0.0141869 | 0.0140915 | 0.0139981 | 0.0139068 | 0.0138175 | 0.0137303 |
| 164 (cm) | 0.0141311 | 0.0140340 | 0.0139389 | 0.0138459 | 0.0137549 | 0.0136659 |
| 165 (cm) | 0.0140763 | 0.0139776 | 0.0138808 | 0.0137861 | 0.0136933 | 0.0136026 |
| 166 (cm) | 0.0140225 | 0.0139222 | 0.0138238 | 0.0137274 | 0.0136329 | 0.0135405 |
| 167 (cm) | 0.0139697 | 0.0138677 | 0.0137677 | 0.0136697 | 0.0135736 | 0.0134795 |
| 168 (cm) | 0.0139178 | 0.0138143 | 0.0137127 | 0.0136131 | 0.0135153 | 0.0134195 |
| 169 (cm) | 0.0138668 | 0.0137618 | 0.0136586 | 0.0135574 | 0.0134581 | 0.0133607 |
| 170 (cm) | 0.0138167 | 0.0137102 | 0.0136055 | 0.0135028 | 0.0134019 | 0.0133028 |
| 171 (cm) | 0.0137675 | 0.0136595 | 0.0135534 | 0.0134490 | 0.0133466 | 0.0132460 |
| 172 (cm) | 0.0137192 | 0.0136097 | 0.0135021 | 0.0133963 | 0.0132923 | 0.0131902 |
| 173 (cm) | 0.0136717 | 0.0135608 | 0.0134517 | 0.0133444 | 0.0132390 | 0.0131353 |
| 174 (cm) | 0.0136250 | 0.0135127 | 0.0134022 | 0.0132935 | 0.0131865 | 0.0130814 |
| 175 (cm) | 0.0135791 | 0.0134654 | 0.0133535 | 0.0132434 | 0.0131350 | 0.0130284 |
| 176 (cm) | 0.0135340 | 0.0134189 | 0.0133056 | 0.0131941 | 0.0130843 | 0.0129763 |
| 177 (cm) | 0.0134896 | 0.0133733 | 0.0132586 | 0.0131457 | 0.0130345 | 0.0129251 |
| 178 (cm) | 0.0134460 | 0.0133283 | 0.0132124 | 0.0130981 | 0.0129856 | 0.0128747 |
| 179 (cm) | 0.0134031 | 0.0132842 | 0.0131669 | 0.0130513 | 0.0129374 | 0.0128252 |
| 180 (cm) | 0.0133610 | 0.0132407 | 0.0131222 | 0.0130053 | 0.0128901 | 0.0127765 |

TABLE 1-continued

|  | 71 (kg) | 72 (kg) | 73 (kg) | 74 (kg) | 75 (kg) | 76 (kg) |
|---|---|---|---|---|---|---|
| 155 (cm) | 0.0142220 | 0.0141547 | 0.0140898 | 0.0140271 | 0.0139666 | 0.0139084 |
| 156 (cm) | 0.0141450 | 0.0140756 | 0.0140085 | 0.0139436 | 0.0138810 | 0.0138205 |
| 157 (cm) | 0.0140695 | 0.0139980 | 0.0139288 | 0.0138618 | 0.0137969 | 0.0137343 |
| 158 (cm) | 0.0139954 | 0.0139219 | 0.0138506 | 0.0137814 | 0.0137145 | 0.0136497 |
| 159 (cm) | 0.0139227 | 0.0138472 | 0.0137738 | 0.0137026 | 0.0136336 | 0.0135667 |
| 160 (cm) | 0.0138513 | 0.0137739 | 0.0136985 | 0.0136253 | 0.0135542 | 0.0134853 |
| 161 (cm) | 0.0137813 | 0.0137019 | 0.0136246 | 0.0135494 | 0.0134763 | 0.0134053 |
| 162 (cm) | 0.0137126 | 0.0136313 | 0.0135521 | 0.0134749 | 0.0133999 | 0.0133269 |
| 163 (cm) | 0.0136451 | 0.0135620 | 0.0134809 | 0.0134018 | 0.0133248 | 0.0132498 |
| 164 (cm) | 0.0135789 | 0.0134939 | 0.0134109 | 0.0133300 | 0.0132511 | 0.0131742 |
| 165 (cm) | 0.0135138 | 0.0134271 | 0.0133423 | 0.0132595 | 0.0131788 | 0.0131000 |
| 166 (cm) | 0.0134500 | 0.0133614 | 0.0132749 | 0.0131903 | 0.0131077 | 0.0130271 |
| 167 (cm) | 0.0133872 | 0.0132970 | 0.0132087 | 0.0131223 | 0.0130379 | 0.0129555 |
| 168 (cm) | 0.0133256 | 0.0132337 | 0.0131437 | 0.0130556 | 0.0129694 | 0.0128851 |
| 169 (cm) | 0.0132651 | 0.0131715 | 0.0130798 | 0.0129900 | 0.0129021 | 0.0128160 |
| 170 (cm) | 0.0132057 | 0.0131104 | 0.0130170 | 0.0129255 | 0.0128359 | 0.0127482 |
| 171 (cm) | 0.0131473 | 0.0130504 | 0.0129554 | 0.0128622 | 0.0127709 | 0.0126815 |
| 172 (cm) | 0.0130899 | 0.0129914 | 0.0128948 | 0.0128000 | 0.0127071 | 0.0126160 |
| 173 (cm) | 0.0130335 | 0.0129335 | 0.0128353 | 0.0127389 | 0.0126443 | 0.0125516 |
| 174 (cm) | 0.0129781 | 0.0128765 | 0.0127768 | 0.0126788 | 0.0125827 | 0.0124883 |
| 175 (cm) | 0.0129236 | 0.0128205 | 0.0127193 | 0.0126198 | 0.0125220 | 0.0124261 |
| 176 (cm) | 0.0128700 | 0.0127655 | 0.0126627 | 0.0125617 | 0.0124625 | 0.0123650 |
| 177 (cm) | 0.0128174 | 0.0127114 | 0.0126072 | 0.0125047 | 0.0124039 | 0.0123048 |
| 178 (cm) | 0.0127656 | 0.0126582 | 0.0125525 | 0.0124485 | 0.0123463 | 0.0122457 |
| 179 (cm) | 0.0127147 | 0.0126059 | 0.0124988 | 0.0123934 | 0.0122897 | 0.0121876 |
| 180 (cm) | 0.0126647 | 0.0125545 | 0.0124460 | 0.0123391 | 0.0122340 | 0.0121305 |

|  | 77 (kg) | 78 (kg) | 79 (kg) | 80 (kg) |
|---|---|---|---|---|
| 155 (cm) | 0.0138525 | 0.0137989 | 0.0137475 | 0.0136983 |
| 156 (cm) | 0.0137623 | 0.0137064 | 0.0136527 | 0.0136012 |
| 157 (cm) | 0.0136739 | 0.0136157 | 0.0135597 | 0.0135059 |
| 158 (cm) | 0.0135871 | 0.0135267 | 0.0134684 | 0.0134124 |
| 159 (cm) | 0.0135020 | 0.0134394 | 0.0133789 | 0.0133206 |
| 160 (cm) | 0.0134184 | 0.0133537 | 0.0132911 | 0.0132306 |
| 161 (cm) | 0.0133364 | 0.0132696 | 0.0132049 | 0.0131423 |
| 162 (cm) | 0.0132559 | 0.0131871 | 0.0131203 | 0.0130556 |
| 163 (cm) | 0.0131769 | 0.0131060 | 0.0130372 | 0.0129704 |
| 164 (cm) | 0.0130994 | 0.0130265 | 0.0129557 | 0.0128869 |
| 165 (cm) | 0.0130232 | 0.0129484 | 0.0128756 | 0.0128048 |
| 166 (cm) | 0.0129484 | 0.0128717 | 0.0127970 | 0.0127242 |
| 167 (cm) | 0.0128749 | 0.0127964 | 0.0127198 | 0.0126451 |
| 168 (cm) | 0.0128028 | 0.0127224 | 0.0126439 | 0.0125674 |
| 169 (cm) | 0.0127319 | 0.0126497 | 0.0125694 | 0.0124910 |
| 170 (cm) | 0.0126623 | 0.0125783 | 0.0124962 | 0.0124160 |
| 171 (cm) | 0.0125939 | 0.0125082 | 0.0124243 | 0.0123423 |
| 172 (cm) | 0.0125267 | 0.0124393 | 0.0123537 | 0.0122699 |
| 173 (cm) | 0.0124606 | 0.0123715 | 0.0122842 | 0.0121987 |
| 174 (cm) | 0.0123957 | 0.0123050 | 0.0122160 | 0.0121288 |
| 175 (cm) | 0.0123319 | 0.0122395 | 0.0121489 | 0.0120600 |
| 176 (cm) | 0.0122692 | 0.0121752 | 0.0120830 | 0.0119925 |
| 177 (cm) | 0.0122075 | 0.0121120 | 0.0120181 | 0.0119260 |
| 178 (cm) | 0.0121469 | 0.0120498 | 0.0119544 | 0.0118607 |
| 179 (cm) | 0.0120873 | 0.0119887 | 0.0118917 | 0.0117965 |
| 180 (cm) | 0.0120287 | 0.0119286 | 0.0118301 | 0.0117333 |

In the first embodiment of the present disclosure, the training device 100 helps the user to swim in the swimming pool or the water tank in a restrained swimmable distance. The processing device 200 computes the user's exercise information of the swimming process according to the tension information provided by the training device, and the processing device 200 also helps the user to execute the swim training program according to the exercise information. The processing device 200 is, for example, a smart phone or a tablet PC. The input module 210 and the output module 240 are, for example, a touch panel of the smart phone or the tablet PC, or a wireless communication module of the smart phone or the tablet PC. The storage module 220 is, for example, a memory of the smart phone or the tablet PC. The processing module 230 is, for example, a processor of the smart phone or the tablet PC. In the first embodiment of the present disclosure, the processing device 200 is the smart phone or the tablet PC, and the wireless communication module 250 is the Bluetooth communication module, but the disclosure is not limited thereto. In other embodiments of the present disclosure, the processing device is a desktop computer, and the input module is a mouse, keyboard, or the wireless communication module, and the storage module is a hard disk, and the processing module is a central processing unit (CPU), and the output module is an external screen.

In the first embodiment of the present disclosure, when the bar 140 of the sensor 140 is pulled, the Bluetooth communication module in the training device 100 and the Bluetooth communication module in the processing device 200 are paired to be communicatively connected to each other. As a result, when the user is using the swim training system, the tension measured by the sensor 140 is instantly transmitted to the processing device 200.

Figure 6:
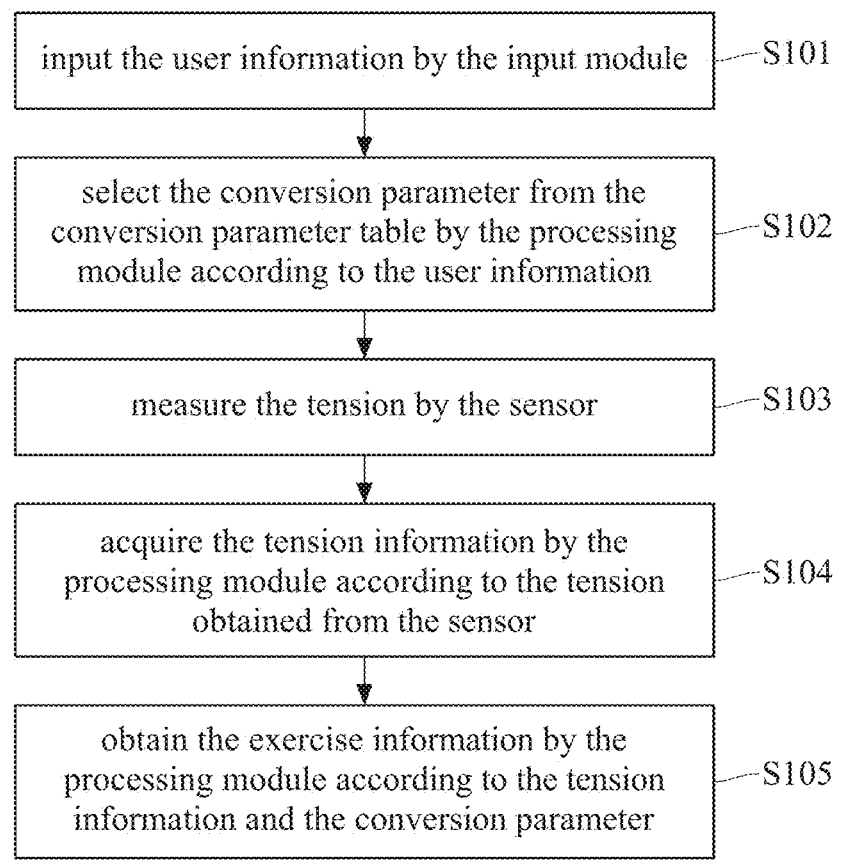
FIG. 6 is a flow chart of a swim data computing method for the swim training system according to the first embodiment of the present disclosure.

The following illustrates steps of a swim data computation method for the swim training system in the first embodiment of the present disclosure. Please refer to FIG. 6. FIG. 6 is a flow chart of a swim data computing method for the swim training system according to the first embodiment of the present disclosure.

First, input the user information by the input module (S101).

In detail, the user's height, weight, and swimming stroke are inputted into the processing module or the storage module by the user with the input module.

Next, select the conversion parameter from the conversion parameter table by the processing module according to the user information (S102).

In detail, the proper conversion parameter is selected from the conversion parameter table by the processing module according to the user's height, weight, and swimming stroke which are inputted into the processing module or the storage module. For example, when the height, the weight, and the swimming stroke inputted by the user are respectively 175 centimeters, 70 kilograms, and breaststroke, the processing module selects the conversion parameter table of the breaststroke, which is the above table 1, and then selects e=0.0130284 as the conversion parameter from table 1.

Next, measure the tension by the sensor (S103).

In detail, the sensor measures the tension in the connecting component when the user is swimming. The tension measured by the sensor is outputted by the wireless communication module. A time interval of the tension measurement by the sensor is, for example, 0.1 second, but the disclosure is not limited thereto. In other embodiments of the present disclosure, the time interval of the tension measurement by the sensor is 0.01 second to 1 second.

Next, acquire the tension information by the processing module according to the tension obtained from the sensor (S104).

In detail, the tension sent by the wireless communication module is received by the processing module. After the processing module receiving the tension, a timing is given to the tension as a tag by the processing module to obtain the tension information.

Next, obtain the exercise information by the processing module according to the tension information and the conversion parameter (S105).

In detail, the instantaneous swimming speed V is obtained by the computation of the processing module according to the formula (I) V=ef, the conversion parameter e, and the tension f in the tension information. Next, the average swimming speed or the swimming distance is further obtained by the computation of the processing module according to two timings and two instantaneous swimming speeds respectively corresponding to the two timings in two tension information. Next, the calorie expenditure is further obtained by the computation of the processing module according to the user information, the two timings and the two instantaneous swimming speeds respectively corresponding to the two timings in the two tension information.

In the step S105, the processing module converts the tension, which is a physical quantity of force, to the instantaneous swimming speed, which is a physical quantity of velocity, according to the conversion parameter selected from the conversion parameter table. As a result, the swim training system in the first embodiment of the present disclosure not only help user to swim in the swimming pool or the water tank with the restrained swimmable distance, but also converts the tension in the connecting component to the instantaneous swimming speed according to the conversion parameter in the conversion parameter table with the cooperation between the training device and the processing device.

In the swim data computation method for the swim training system in the first embodiment of the present disclosure, the step S102 to the step S104 are executed in sequence, but the present disclosure is not limited thereto. In other embodiments of the present disclosure, the step S102 and the step S103 in the swim data computation method have no particular order to be executed, or the step S102 and the step S104 in the swim data computation method have no particular order to be executed.

In the swim data computation method for the swim training system in the first embodiment of the present disclosure, the conversion parameter is selected according to the user's height, weight, and swimming stroke, but the present disclosure is not limited thereto. In other embodiments of the present disclosure, the conversion parameter is calibrated according to the user's gender, arm length, leg length, or waistline so as to further improve the accuracy of the instantaneous swimming speed obtained by the computation.

Figure 7:
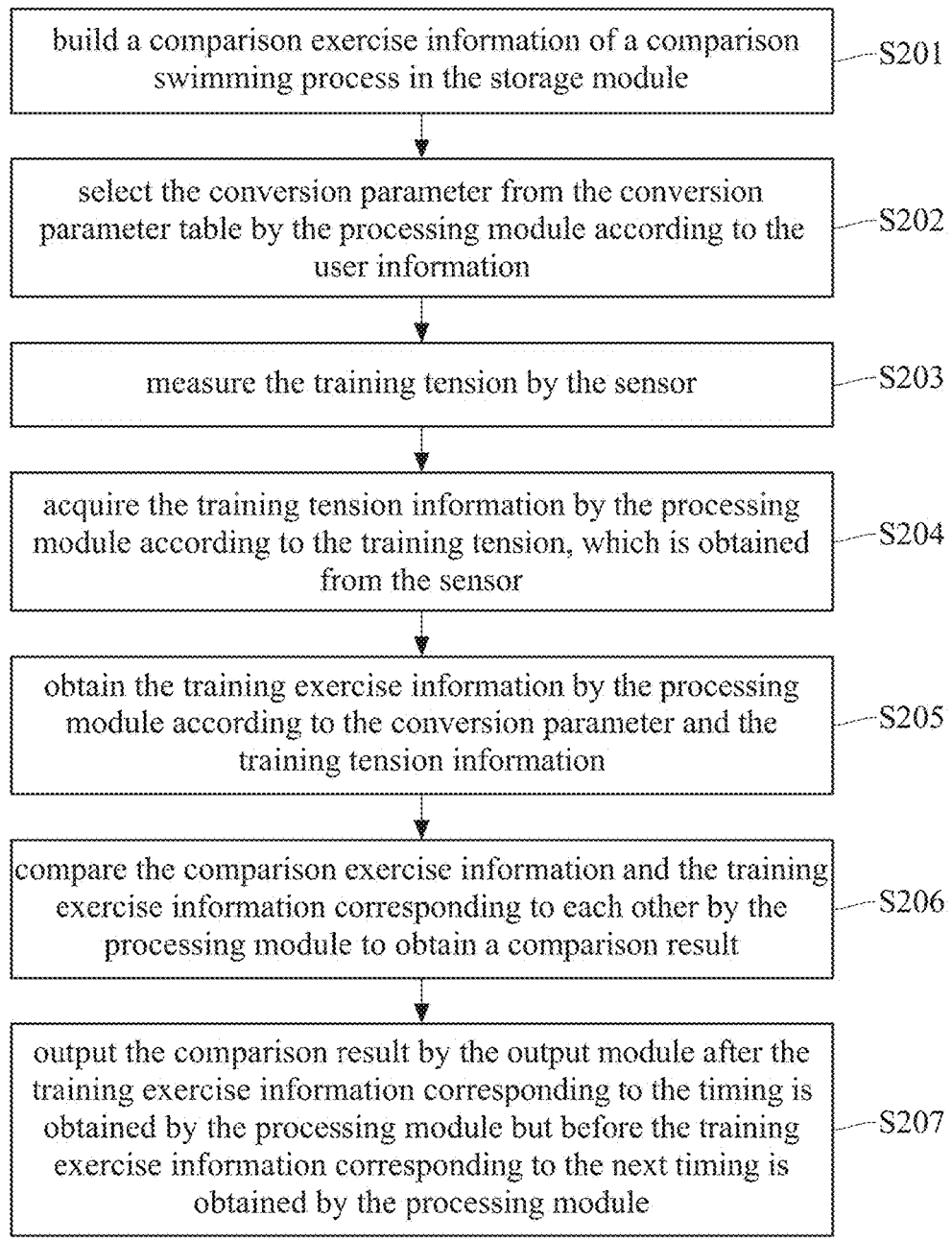
FIG. 7 is a flow chart of a swim training method for the swim training system according to the first embodiment of the present disclosure.
Figure 8:
FIG. 8 to FIG. 11 are schematic views of a display screen of an output module of the swim training system according to the first embodiment of the present disclosure.
Figure 9:
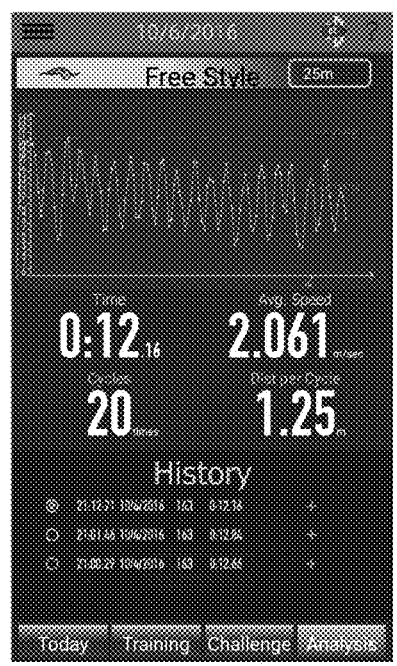
Figure 10:

The following illustrates steps of a swim training method for the swim training system in the first embodiment of the present disclosure. Please refer to FIG. 7 to FIG. 11. FIG. 7 is a flow chart of a swim training method for the swim training system according to the first embodiment of the present disclosure. FIG. 8 to FIG. 11 are schematic views of a display screen of an output module of the swim training system according to the first embodiment of the present disclosure.

First, build a comparison exercise information of a comparison swimming process in the storage module (S201).

In detail, input and store the comparison exercise information of the comparison swimming process into the storage module by the input module, or record the comparison exercise information of the comparison swimming process by the swim training system. The comparison exercise information includes a Nth comparison instantaneous swimming speed to a (N+1)th comparison instantaneous swimming speed and a Nth timing to a (N+1)th timing which respectively correspond to the Nth comparison instantaneous swimming speed to the (N+1)th comparison instantaneous swimming speed, or a Nth comparison tension information to a (N+1)th comparison tension information and the Nth timing to the (N+1)th timing which respectively correspond to the Nth comparison tension information to the (N+1)th comparison tension information; wherein, the N is a positive integer greater than zero. The comparison exercise information is able to further include a Nth comparison swimming distance which is corresponding to the Nth timing, or a Nth comparison average swimming speed which is corresponding to the Nth timing. When the comparison exercise information is the exercise information recorded by the swim training system from the same user, there is no need to enter the user information again. When the comparison exercise information is the exercise information recorded by the swim training system from a previous user, the user needs to input a previous user information of the previous user so that the processing device is able to select a proper conversion parameter for executing the conversion between the comparison tension information and the comparison instantaneous swimming speed.

Next, select the conversion parameter from the conversion parameter table by the processing module according to the user information (S202).

In detail, the proper conversion parameter is selected from the conversion parameter table by the processing module according to the user's height, weight, and swimming stroke, which are inputted into the processing module or the storage module by the user.

Next, measure the training tension by the sensor (S203).

In detail, a Nth training tension to a (N+1)th training tension are respectively measured at the Nth timing to the (N+1)th timing by the sensor. The Nth training tension corresponds to the Nth timing, and the (N+1)th training tension corresponds to the (N+1)th timing. As a result, timing intervals of the training tensions measured by the sensor are the same as the timing intervals of the comparison instantaneous swimming speeds or the timing intervals of the comparison tension information so as to provide a basis for comparison on an equal timing interval.

Next, acquire the training tension information by the processing module according to the training tension, which is obtained from the sensor (S204).

In detail, the Nth training tension to the (N+1)th training tension, which are transmitted by the wireless communication module, are received by the processing module. After the processing module receives the Nth training tension to the (N+1)th training tension, the Nth training tension to the (N+1)th training tension are tagged by the timing to acquire the Nth training tension information to the (N+1)th training tension information by the processing module.

Next, obtain the training exercise information by the processing module according to the conversion parameter and the training tension information (S205).

In detail, the training instantaneous swimming speed V is obtained by the computation executed by the processing module according to the formula (I), the conversion parameter e, and the training tension f in the training tension information. Next, the average training swimming speed or the training swimming distance is able to be obtained by the further computation executed by the processing module according to the Nth training instantaneous swimming speed and the (N+1)th training instantaneous swimming speed which are respectively corresponding to the Nth timing and the (N+1)th timing. Next, the calorie expenditure is able to be obtained by the further computation executed by the processing module according to the user information, the Nth training instantaneous swimming speed and the (N+1)th training instantaneous swimming speed which are respectively corresponding to the Nth timing and the (N+1)th timing.

Next, compare the comparison exercise information and the training exercise information corresponding to each other by the processing module to obtain a comparison result (S206).

In detail, the Nth training instantaneous swimming speed and the Nth comparison instantaneous swimming speed, which are corresponding to the Nth timing, are compared by the processing module, or the Nth training average swimming speed and the Nth comparison average swimming speed, which are corresponding to the Nth timing, are compared by the processing module, or the Nth training swimming distance and the Nth comparison swimming distance, which are corresponding to the Nth timing, are compared by the processing module.

Next, output the comparison result by the output module after the training exercise information corresponding to the timing is obtained by the processing module but before the training exercise information corresponding to the next timing is obtained by the processing module (S207).

In detail, when the comparison result is that the Nth comparison instantaneous swimming speed is greater than the Nth training instantaneous swimming speed, the processing module comments the output module to output a first notification. When the comparison result is that the Nth comparison instantaneous swimming speed is smaller than the Nth training instantaneous swimming speed, the processing module comments the output module to output a second notification. When the comparison result is that the Nth comparison average swimming speed is greater than the Nth training average swimming speed, the processing module comments the output module to output the first notification, when the comparison result is that the Nth comparison average swimming speed is smaller than the Nth training average swimming speed, the processing module comments the output module to output the second notification. When the comparison result is that the Nth comparison swimming distance is greater than the Nth training swimming distance, the processing module comments the output module to output the first notification. When the comparison result is that the Nth comparison swimming distance is smaller than the Nth training swimming distance, the processing module comments the output module to output the second notification.

Before the processing module obtains the comparison result of the (N+1)th timing, the processing module comments the output module to output the comparison result of the Nth timing so that the output module is able to instantly provide the comparison result to the user. Therefore, the user is able to realize the user's performance is better or worse than the performance in the comparison swimming process, but the disclosure is not limited thereto. In other embodiments of the present disclosure, the processing module is also available to comment the output module to output all the comparison results of all the timings at once after obtaining all the comparison results of all the timings.

In the swim training method for the swim training system in the first embodiment of the present disclosure, the step S202 to the step S204 are executed in sequence, but the present disclosure is not limited thereto. In other embodiments of the present disclosure, the step S202 and the step S203 in the swim training method have no particular order to be executed, or the step S202 and the step S204 in the swim training method have no particular order to be executed.

Figure 11:
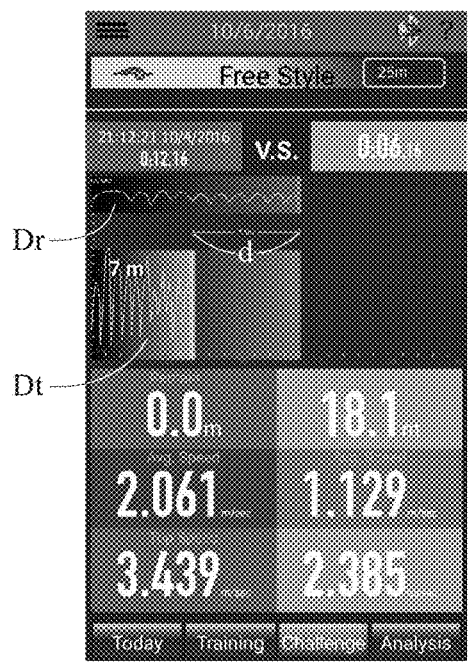

As shown in FIG. 8 to FIG. 11, the comparison exercise information, the training exercise information, and the comparison result are visualized to be presented by the output module, but the disclosure is not limited thereto. The comparison exercise information, the training exercise information, and the comparison result are presented in sound by the output module to notify the user. For example, the output module presents the exercise information in digital form on the display, and the output module uses the line graph to show the instantaneous swimming speeds at different timings and the bar graph to show the accumulation of the calorie expenditure. Moreover, as shown in FIG. 11, the output module presents the bar graph of the comparison swimming distance Dr and the bar graph of the training swimming distance Dt on the display at every corresponding timings. The distance difference d between the comparison swimming distance Dr and the training swimming distance Dt is marked on the display so that the comparison result between the comparison swimming distance and the training swimming distance is able to be realized easily in a short time by the user.

In the swim training method for the swim training system in the first embodiment of the present disclosure, after the processing module compares the training exercise information and the comparison exercise information, the processing module comments the display module to provide the first notification or the second notification to the user according to the comparison result. Therefore, during the swim training process, the user is notified by the display module about that the user's swimming performance is better or worse than the swimming performance of the comparison swimming process. As a result, the swim training method for the swim training system in the first embodiment of the present disclosure helps the user to execute the swim training program for improving the training result.

Figure 12:
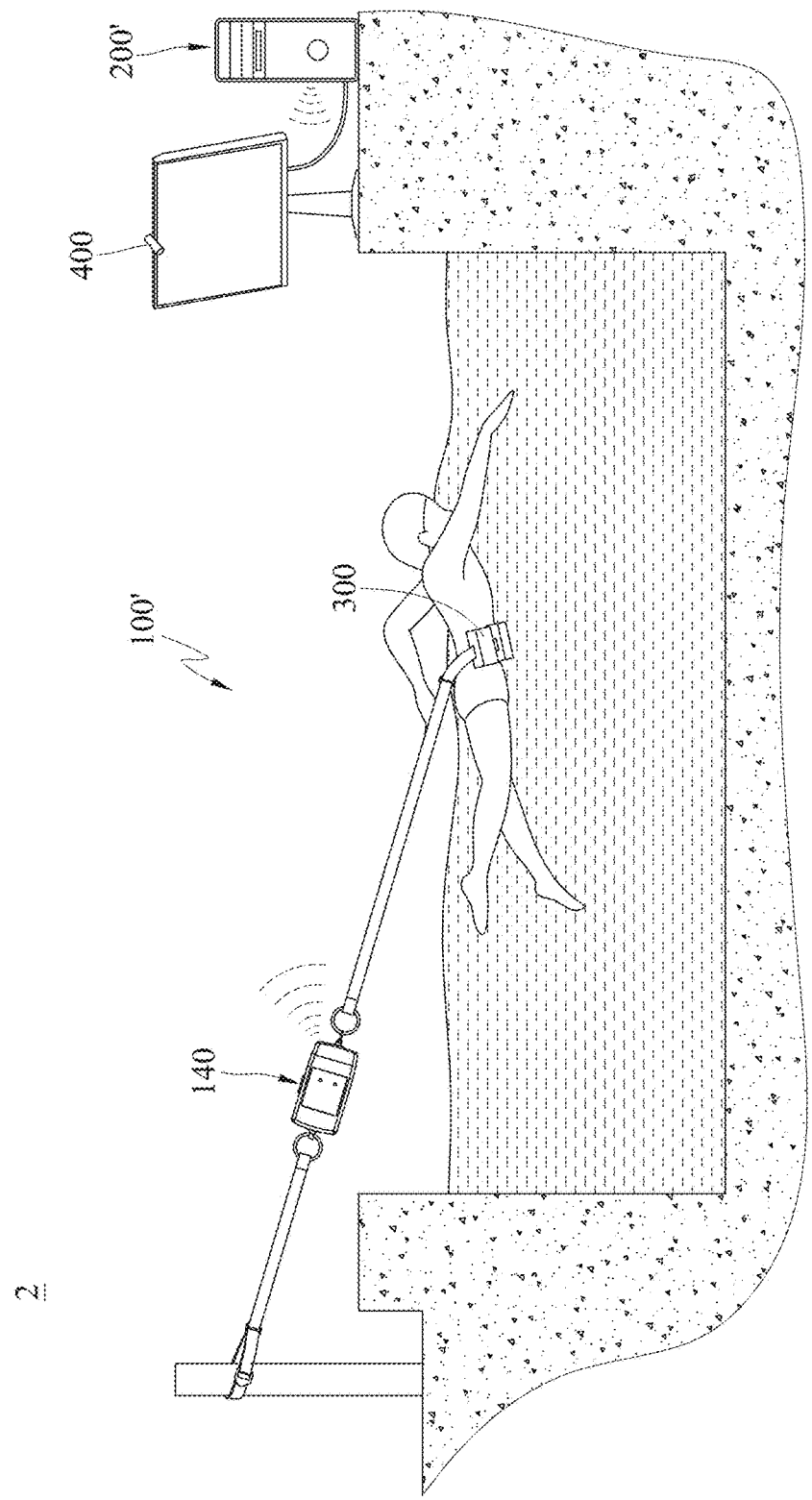
FIG. 12 is a schematic view of a swim training system according to a second embodiment of the present disclosure.

The following illustrates a swim training system 2 in the second embodiment of the present disclosure. Please refer to FIG. 12. FIG. 12 is a schematic view of a swim training system according to a second embodiment of the present disclosure. The swim training system 2 in the second embodiment of the present disclosure is similar to the swim training system 1 in the first embodiment of the present disclosure. Only the differences between the swim training system 2 and the swim training system 1 are explained herein, and the same structures thereof are not repeated herein.

The swim training system 2 in the second embodiment of the present disclosure includes a training device 100', a processing device 200', a buoyancy auxiliary device 300, and a photography device 400. The buoyancy auxiliary device 300 is disposed at the wearing component 120 so as to provide an auxiliary buoyancy to the user. The buoyancy auxiliary device 300 is, for example, floats or airbags installed at the wearing component 120. In the second embodiment of the present disclosure, the buoyancy auxiliary device is located at the user's ventral side, but the disclosure is not limited thereto. In other embodiments of the present disclosure, the buoyancy auxiliary device is located at the user's backside or waist side.

When the user is swimming in the swimming pool without the training device 100 in the swim training system 1, a relative movement between the user and the water flow generates a buoyancy for the user. However, when the user is swimming in the swimming pool with the training device 100 in the swim training system 1, there is no relative movement between the user and the water flow so that no buoyancy is generated for the user. As a result, the user swimming with the swim training system 1 spends an extra strength to maintain the swimming stroke since the lower body tends to sink.

The buoyancy auxiliary device 300 in the swim training system 2 provides the auxiliary buoyancy to compensate the buoyancy generated by the relative movement between the user and the water flow. As a result, the user's lower body has no tendency to sink, and the user has no need to spend the extra strength to maintain the swimming stroke.

Comparing with the wearing component 120 without the buoyancy auxiliary device 300, after the wearing component 120 is equipped with the buoyancy auxiliary device 300, the user's swimming stroke and force using method are changed. Therefore, the storage module in the processing device 200' further stores a buoyancy parameter table for calibrating the conversion parameter. A proper conversion parameter is selected from the conversion parameter table as an original conversion parameter by the processing module according to the user's height, weight, and swimming stroke. A buoyancy parameter is also selected from the buoyancy parameter table by the processing module according to the magnitude of the auxiliary buoyancy. The original conversion parameter is calibrated with the buoyancy parameter by the processing module to obtain a conversion parameter. Next, the instantaneous swimming speed is obtained by the processing module according to the conversion parameter and the tension measured by the sensor 140'. An average swimming speed, a swimming distance, or a calorie expenditure is further obtained by the processing module according to the conversion parameter, the tension measured by the sensor 140', a timing corresponding to the tension, and the user information.

The buoyancy parameter table in the swim training system 2 of the second embodiment of the present disclosure is shown in the following table 2.

TABLE 2

| weight (kg) | Float number $f_n$ | buoyancy (kg) |
| --- | --- | --- |
| 40 | 3 | 1.5 |
| 50 | 4 | 2.0 |
| 60 | 4 | 2.0 |
| 70 | 4 | 2.0 |
| 80 | 4 | 2.0 |
| 90 | 5 | 2.5 |
| 100 | 5 | 2.5 |

After the float number is selected from table 2 by the processing module according to the user's weight in the user information, the original conversion parameter is calibrated with a formula (II) to obtain the conversion parameter.

$$e = e_0 - 0.0000562 * f_n; \quad \text{Formula (II)}$$

wherein, e is the conversion parameter, $e_0$ is the original conversion parameter, and $f_n$ is the float number.

The photography device 400 is disposed around the swimming pool or the water tank and communicatively connected to the processing module. The photography device 400 is configured to photo or shoot user image of the user's swimming action, and the user image, as a part of the exercise information, is also recorded in the storage module. The user image photoed or shot by the photography device 400 is able to be directly displayed on the output module.

In the swim training system 2 of the second embodiment, the processing device 200' is, for example, a desktop computer, and the input module is, for example, a mouse, a keyboard, or a wireless communication module. The storage module is, for example, a hard disk. The processing module is, for example, a central processing unit (CPU). The output module is, for example, an external screen. The photography device 400 is, for example, an external camera. However, the present disclosure is not limited thereto. In other embodiments of the present disclosure, the processing device is a smart phone or a tablet PC, and the photography device is the camera of the smart phone or the tablet PC.

Figure 13:
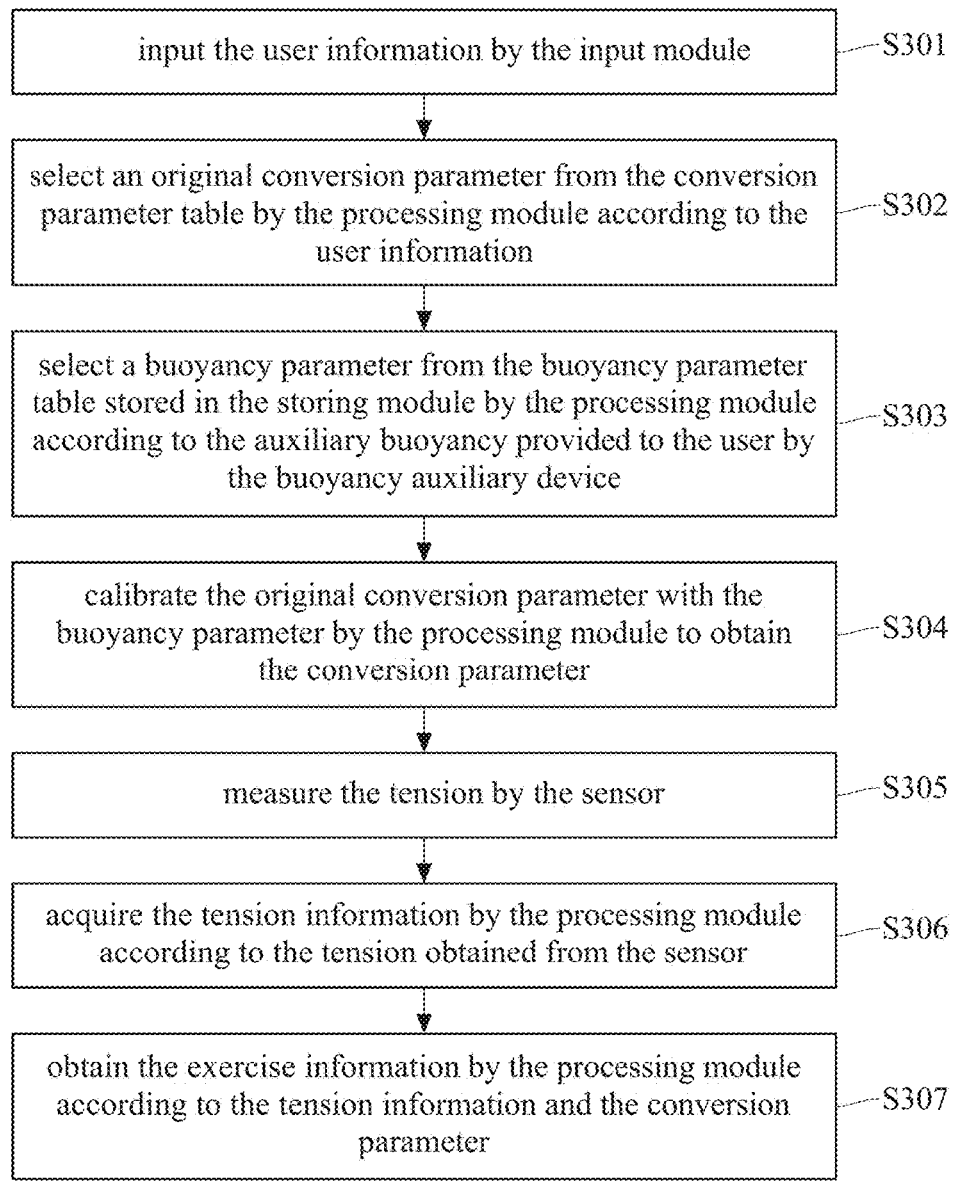
FIG. 13 is a flow chart of a swim data computing method for the swim training system according to the second embodiment of the present disclosure.

The following illustrates steps of a swim data computation method for the swim training system in the second embodiment of the present disclosure. Please refer to FIG. 13. FIG. 13 is a flow chart of a swim data computing method for the swim training system according to the second embodiment of the present disclosure. The step S301, and 304 to S307 in the swim data computation method for the swim training system 2 in the second embodiment is similar to the step S101, and 103 to S105 in the swim data computation method for the swim training system 1 in the first embodiment. Only the different steps S302 and S303 are explained herein.

After executing the step S301, next, select an original conversion parameter from the conversion parameter table by the processing module according to the user information (S302).

In detail, the proper original conversion parameter is selected from the conversion parameter table by the processing module according to the user's height, weight, and swimming stroke, which are inputted into the processing module or the storage module. For example, when the height, the weight, and the swimming stroke inputted by the user are respectively 175 centimeters, 70 kilograms, and breaststroke, the processing module selects the conversion parameter table of the breaststroke, which is the above table 1, and then selects e=0.0130284 as the original conversion parameter from table 1.

Next, select a buoyancy parameter from the buoyancy parameter table stored in the storage module by the processing module according to the auxiliary buoyancy provided to the user by the buoyancy auxiliary device (S303).

In detail, the float number of the buoyancy auxiliary device is determined by the user according to the user's weight. Next, the proper buoyancy parameter is selected from the buoyancy parameter table by the processing module according to the float number, which is proportional to the magnitude of the buoyancy. The float number, as a part of the user information, is inputted in to the processing module or the storage module by the user, but the disclosure is not limited thereto. In other embodiments of the present disclosure, the proper float number is selected from the table 2 by the processing module according to the user's weight in the user information.

Next, calibrate the original conversion parameter with the buoyancy parameter by the processing module to obtain the conversion parameter (S304).

In detail, the original conversion parameter is calibrated with the buoyancy parameter by the processing module to obtain the conversion parameter. For example, when the user's weight is 70 kilograms, the buoyancy auxiliary device has 4 floats. The original conversion parameter $e_0$ is subtracted 0.0000562*4 to obtain the conversion parameter e=0.0128036 according to formula (II) $e=e_0-0.0000562*f_n$ by the processing module.

Next, execute the following step S305 to S307 to obtain the exercise information.

In the swim data computation method for the swim training system in the second embodiment of the present disclosure, the step S302 to the step S306 are executed in sequence, but the present disclosure is not limited thereto. In other embodiments of the present disclosure, the step S302 to the step S303 are executed in sequence, and the step S304 to the step S306 are executed in sequence; however, the step S302 and the step S305 have no particular order to be executed, and the step S302 and the step S306 have no particular order to be executed, and the step S303 and the step S305 have no particular order to be executed, and the step S303 and the step S306 have no particular order to be executed.

In the swim data computation method for the swim training system in the second embodiment of the present disclosure, except for using the original conversion parameter, which is selected according to the user's height, weight, and swimming stroke, the original conversion parameter is further calibrated with the buoyancy by the processing unit according to the formula (II) to obtain the conversion parameter. As a result, the instantaneous swimming speed, which is converted from the tension by the swim data computation method for the swim training system in the second embodiment, is more close to the actual instantaneous swimming speed of the user swimming in the conventional swimming pool without the training device.

Figure 14:
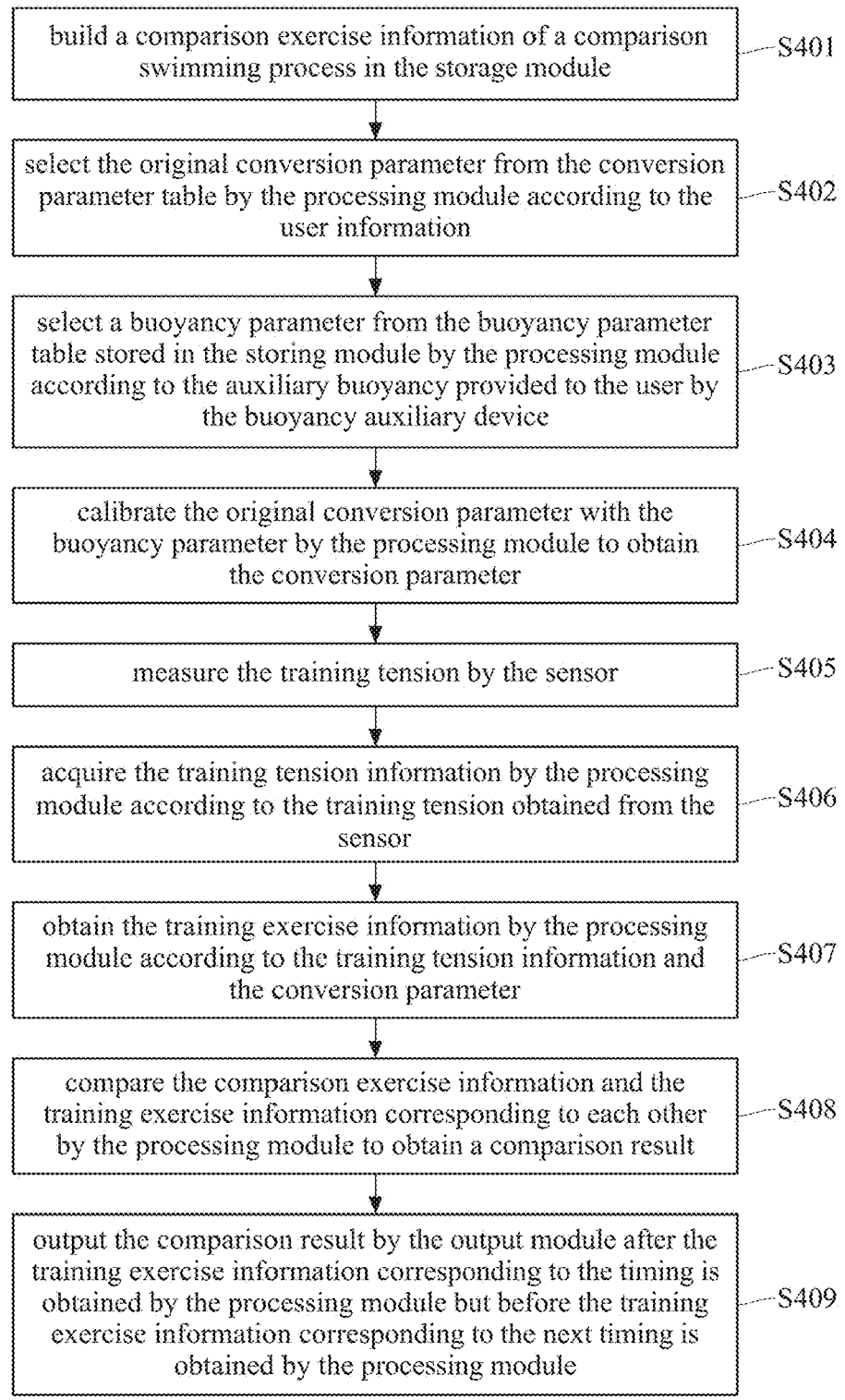
FIG. 14 is a flow chart of a swim training method for the swim training system according to the second embodiment of the present disclosure.

The following illustrates steps of a swim training method for the swim training system in the second embodiment of the present disclosure. Please refer to FIG. 14. FIG. 14 is a flow chart of a swim training method for the swim training system according to the second embodiment of the present disclosure. The step S401, and 405 to S409 in the swim data computation method for the swim training system 2 in the second embodiment is similar to the step S201, and 204 to S207 in the swim training method for the swim training system 1 in the first embodiment. Only the different steps S401 to S404 are explained herein.

After executing the step S401, next, select an original conversion parameter from the conversion parameter table by the processing module according to the user information (S402).

In detail, the proper original conversion parameter is selected from the conversion parameter table by the processing module according to the user's height, weight, and swimming stroke, which are inputted into the processing module or the storage module.

Next, select a buoyancy parameter from the buoyancy parameter table stored in the storage module by the processing module according to the auxiliary buoyancy provided to the user by the buoyancy auxiliary device (S403)

In detail, the float number of the buoyancy auxiliary device is determined by the user according to the user's weight. Next, the proper buoyancy parameter is selected from the buoyancy parameter table by the processing module according to the float number, which is proportional to the magnitude of the buoyancy. The float number, as a part of the user information, is inputted in to the processing module or the storage module by the user, but the disclosure is not limited thereto. In other embodiments of the present disclosure, the proper float number is selected from the table 2 by the processing module according to the user's weight in the user information.

Next, calibrate the original conversion parameter with the buoyancy parameter by the processing module to obtain the conversion parameter (S404).

In detail, the original conversion parameter is calibrated with the buoyancy parameter by the processing module to obtain the conversion parameter.

Next, execute the following step S405 to S409 to obtain the comparison result.

In the swim data computation method for the swim training system in the second embodiment of the present disclosure, the step S402 to the step S406 are executed in sequence, but the present disclosure is not limited thereto. In other embodiments of the present disclosure, the step S402 to the step S404 are executed in sequence, and the step S405 to the step S406 are executed in sequence; however, the step S402 and the step S405 have no particular order to be executed, and the step S402 and the step S406 have no particular order to be executed, and the step S403 and the step S405 have no particular order to be executed, and the step S403 and the step S406 have no particular order to be executed, and the step S404 and the step S405 have no particular order to be executed, and the step S404 and the step S406 have no particular order to be executed.

In the swim training method for the swim training system in the second embodiment of the present disclosure, except for using the original conversion parameter, which is selected according to the user's height, weight, and swimming stroke, the original conversion parameter is further calibrated with the buoyancy by the processing unit according to the formula (II) to obtain the conversion parameter. As a result, the instantaneous swimming speed, which is converted from the tension by the swim data computation method for the swim training system in the second embodiment, is more close to the actual instantaneous swimming speed of the user swimming in the conventional swimming pool without the training device. Therefore, the swim training method for the swim training system in the second embodiment of the present disclosure helps the user to execute the swim training program for further improving the training result.

According to the swim training system, the swim data computation method using the same, and the swim training method using the same, the conversion parameter is selected from the conversion parameter table according to the user information so as to perform the following conversion between the tension and the swimming speed. As a result, the processing module performs the conversion between the tension and the swimming speed with a proper conversion parameter, and therefore, a more accurate swimming speed is obtained.

Moreover, in the swim training system, the swim data computation method using the same, and the swim training method using the same, the original conversion parameter is further calibrated with the buoyancy, which is proportion to the float number, by the processing unit to obtain the conversion parameter. As a result, the instantaneous swimming speed, which is converted from the tension by the swim training system, is more close to the actual instantaneous swimming speed of the user swimming in the conventional swimming pool without the training device.

What is claimed is:

1. A swim training system, comprising:
    a training device, comprising:
        a wearing component configured to fix the training device to an user;
        a fastening component;
        a connecting component configured to connect the wearing component to the fastening component; and
        a sensor installed on the connecting component and located between the wearing component and the fastening component, and the sensor being configured to measure a tension of the connecting component; and
    a processing device, comprising:
        an input module configured to input an user information, the user information including a height, a weight, and a swimming stroke;
        a storage module configured to store a conversion parameter table;
        a processing module communicatively connected to the sensor, the storage module, and the input module, a conversion parameter being selectable from the conversion parameter table by the processing module according to the user information, the tension being obtainable from the sensor by the processing module, a tension information being acquirable by the processing module according to the tension, an exercise information being obtainable by the processing module according to the tension information and the conversion parameter; and
        an output module communicatively connected to the processing module, and the output module being configured to output the exercise information.

2. The swim training system of claim 1, wherein the tension information comprises the tension and a timing corresponding to each other, the exercise information comprises an instantaneous swimming speed information, an average swimming speed, a swimming distance, or a calorie expenditure, and the instantaneous swimming speed information comprises an instantaneous swimming speed and the timing corresponding to each other.

3. The swim training system of claim 1, further comprising a buoyancy auxiliary device installed on the wearing component, and the buoyancy auxiliary device being configured to provide an auxiliary buoyancy to the user.

4. The swim training system of claim 3, wherein a buoyancy parameter table is stored in the storage module, a buoyancy parameter is selectable from the buoyancy parameter table by the processing module according to the auxiliary buoyancy, and the conversion parameter is calibratable with the buoyancy parameter by the processing module.

5. The swim training system of claim 1, further comprising a photography device communicatively connected to the storage module and the output module, the photography device being configured to photo or shoot a user image, and transmit the user image to the storage module, for storage, or the output module, for displaying.

6. The swim training system of claim 1, wherein the input module is further configured to input a comparison exercise information, the comparison exercise information comprises a plurality of timings, the comparison exercise information further comprises either a plurality of instantaneous swimming speeds which respectively correspond to the plurality of timings or a plurality of comparison tensions which respectively correspond to the plurality of timings.

7. The swim training system of claim 1, wherein the sensor comprises:
    a casing having an accommodating space and two through holes which are communicated with each other, and the two through holes located at two sides of the casing which are opposite to each other;
    a bar penetrating through the casing, the bar having a first fastening end and a second fastening end which are opposite to each other, the first fastening end and the second fastening end respectively penetrating through the two through holes, and the first fastening end and the second fastening end being configured to be fastened by the connecting component;
    a tension measurement module disposed in the accommodating space and electrically connected to the bar, and the tension measurement module being configured to measure the tension of the connecting component applied on the bar; and
    two liquid resistant rings respectively disposed at the two through holes, each of the two liquid resistant rings has a clearance hole and a slit communicated with each other, the first fastening end and the second fastening end respectively penetrating through the two clearance holes, one of the two liquid resistant rings being pressed by the casing and the first fastening end and deformed to seal the corresponding slit, and the other one of the two liquid resistant rings being pressed by the casing and the second fastening end and deformed to seal the corresponding slit.

8. The swim training system of claim 7, wherein the sensor further comprises a circuit board and a liquid resistant cover, the circuit board is disposed in the accommodating space, and the circuit board has a charging connector, the casing further has a charging hole, the charging connector corresponds to the charging hole, and the liquid resistant cover openably seals the charging hole.

9. A swim data computation method for the swim training system of claim 1, comprising steps of:
- selecting the conversion parameter from the conversion parameter table by the processing module according to the user information;
- measuring the tension by the sensor;
- acquiring the tension information by the processing module according to the tension obtained from the sensor; and
- obtaining the exercise information by the processing module according to the tension information and the conversion parameter.

10. The swim data computation method of claim 9, wherein the step of obtaining the exercise information by the processing module according to the tension information and the conversion parameter comprises:
- obtaining an instantaneous swimming speed by the processing module according to the conversion parameter and the tension in the tension information;
- obtaining an average swimming speed or a swimming distance by the processing module according to two timings and two instantaneous swimming speeds corresponding to the two timings in two of the tension information; and
- obtaining a calorie expenditure by the processing module according to the user information, the two timings and the two instantaneous swimming speeds corresponding to the two timings in the two tension information.

11. The swim data computation method of claim 9, wherein the step of selecting the conversion parameter from the conversion parameter table by the processing module according to the user information comprises:
- selecting an original conversion parameter from the conversion parameter table by the processing module according to the user information;
- selecting a buoyancy parameter from a buoyancy parameter table stored in the storage module by the processing module according to an auxiliary buoyancy provided to the user by an buoyancy auxiliary device; and
- calibrating the original conversion parameter with the buoyancy parameter by the processing module to obtain the conversion parameter.

12. The swim data computation method of claim 9, further comprising a step of inputting the user information to the processing module or the storage module by the input module before the step of selecting the conversion parameter from the conversion parameter table by the processing module according to the user information.

13. A swim training method for the swim training system of claim 1, comprising steps of:
- building a comparison exercise information of a comparison swimming process in the storage module, wherein the comparison exercise information comprises a Nth comparison instantaneous swimming speed to a (N+1)th comparison instantaneous swimming speed and a Nth timing to a (N+1)th timing which respectively correspond to the Nth comparison instantaneous swimming speed to the (N+1)th comparison instantaneous swimming speed, or a Nth comparison tension information to a (N+1)th comparison tension information and the Nth timing to the (N+1)th timing which respectively correspond to the Nth comparison tension information to the (N+1)th comparison tension information, wherein N is a positive integer greater than zero;
- selecting the conversion parameter from the conversion parameter table by the processing module according to the user information;
- measuring a Nth training tension to a (N+1)th training tension at the Nth timing to the (N+1)th timing, respectively, by the sensor, wherein the Nth training tension corresponds to the Nth timing, and the (N+1)th training tension corresponds to the (N+1)th timing;
- acquiring a Nth training tension information to a (N+1)th training tension information by the processing module according to the Nth training tension to the (N+1)th training tension which are obtained from the sensor;
- obtaining a training exercise information by the processing module, according to the Nth training tension information to the (N+1)th training tension information and the conversion parameter; and
- comparing the comparison exercise information and the training exercise information corresponding to each other by the processing module to obtain a comparison result.

14. The swim training method of claim 13, wherein the comparison exercise information comprises a Nth comparison swimming distance corresponding to the Nth timing, the training exercise information comprises a Nth training swimming distance corresponding to the Nth timing, when the comparison result is that the Nth comparison swimming distance is greater than the Nth training swimming distance, the output module outputs a first notification, when the comparison result is that the Nth comparison swimming distance is smaller than the Nth training swimming distance, the output module outputs a second notification.

15. The swim training method of claim 13, wherein the comparison exercise information comprises a Nth comparison instantaneous swimming speed corresponding to the Nth timing, the training exercise information comprises a Nth training instantaneous swimming speed corresponding to the Nth timing, when the comparison result is that the Nth comparison instantaneous swimming speed is greater than the Nth training instantaneous swimming speed, the output module outputs a first notification, when the comparison result is that the Nth comparison instantaneous swimming speed is smaller than the Nth training instantaneous swimming speed, the output module outputs a second notification.

16. The swim training method of claim 13, wherein the comparison exercise information comprises a Nth comparison average swimming speed corresponding to the Nth timing, the training exercise information comprises a Nth training average swimming speed corresponding to the Nth timing, when the comparison result is that the Nth comparison average swimming speed is greater than the Nth training average swimming speed, the output module outputs a first notification, when the comparison result is that the Nth comparison average swimming speed is smaller than the Nth training average swimming speed, the output module outputs a second notification.

17. The swim training method of claim 13, wherein the output module visualizes the comparison exercise information, the training exercise information, and the comparison result.

18. The swim training method of claim 13, further comprising a step of outputting the comparison result by the output module, wherein the comparison result is output after the training exercise information corresponding to the Nth timing is obtained by the processing module but before the training exercise information corresponding to the (N+1)th timing is obtained by the processing module.

19. The swim training method of claim 13, wherein the comparison exercise information of the comparison swimming process is recorded by the swimming training system in the step of building the comparison exercise information of the comparison swimming process in the storage module.

20. The swim training method of claim 13, wherein the comparison exercise information of the comparison swimming process is inputted into the storage module by the inputting module in the step of building the comparison exercise information of the comparison swimming process in the storage module.

21. The swim training method of claim 13, wherein the step of selecting the conversion parameter from the conversion parameter table by the processing module according to the user information comprises:
   selecting an original conversion parameter from the conversion parameter table by the processing module according to the user information;
   selecting a buoyancy parameter from a buoyancy parameter table stored in the storage module by the processing module according to an auxiliary buoyancy provided to the user by an buoyancy auxiliary device; and
   calibrating the original conversion parameter with the buoyancy parameter by the processing module to obtain the conversion parameter.

* * * * *